United States Patent [19]

Yaguchi

[11] 4,210,390
[45] Jul. 1, 1980

[54] ELECTROCHROMIC COMPOSITION AND ELECTROCHROMIC DISPLAY DEVICE USING SAME

[75] Inventor: Masachika Yaguchi, Yokohama, Japan

[73] Assignee: Dai Nippon Toryo Co., Ltd., Osaka, Japan

[21] Appl. No.: 919,607

[22] Filed: Jun. 27, 1978

[30] Foreign Application Priority Data

Jun. 28, 1977 [JP] Japan .................. 52-76114
May 22, 1978 [JP] Japan .................. 53-60721

[51] Int. Cl.² ............... G02F 1/17; G09F 9/30
[52] U.S. Cl. ....................... 350/357; 252/408
[58] Field of Search ........... 350/357; 252/408, 518, 252/300

[56] References Cited

U.S. PATENT DOCUMENTS

| | | | |
|---|---|---|---|
| 3,451,741 | 6/1969 | Manos | 252/408 |
| 3,652,149 | 3/1972 | Rogers | 350/357 |
| 3,806,229 | 4/1974 | Schoot et al. | 252/299 |
| 3,854,794 | 12/1974 | Van Dam et al. | 350/357 |
| 3,912,368 | 10/1975 | Ponjee et al. | 350/357 |
| 3,963,314 | 6/1976 | Yamashita | 350/357 |
| 4,036,551 | 7/1977 | Mori | 350/357 |
| 4,117,659 | 10/1978 | Takeshita | 350/357 |
| 4,166,676 | 9/1979 | Furuta et al. | 350/357 |

FOREIGN PATENT DOCUMENTS

| | | | |
|---|---|---|---|
| 2449278 | 4/1975 | Fed. Rep. of Germany | 350/357 |
| 2707099 | 8/1977 | Fed. Rep. of Germany | 350/357 |
| 51-23488 | 2/1976 | Japan | 252/408 |
| 51-44897 | 4/1976 | Japan | 350/357 |
| 52-100381 | 8/1977 | Japan | 252/408 |

OTHER PUBLICATIONS

Kawata, T. et al., Jap. J. Appl. Phys., vol. 14, No. 5, pp. 725–726 (1975).

Primary Examiner—Teddy S. Gron
Attorney, Agent, or Firm—Gerald J. Ferguson, Jr.; Joseph J. Baker

[57] ABSTRACT

An electrochromic composition is composed of a solvent, an electrochromic compound having a high solubility to the solvent, and a compound selected from a group of ammonia, organic amine and alkali. The solubility of the electrochromic compound to the solvent is not less than $10^{-2}$ mol/100 g-solvent in a reduced state and not less than $10^{-1}$ mol/100 g-solvent in an oxidized state. A masking agent may be added to the EC compound. The EC composition is sealed in an EC display cell.

32 Claims, 3 Drawing Figures

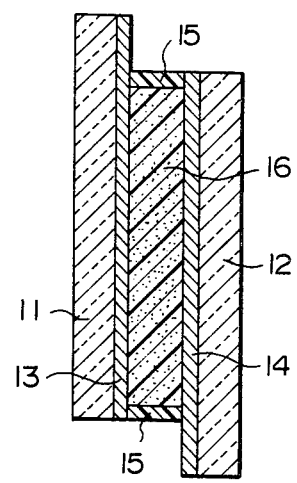
FIG. I
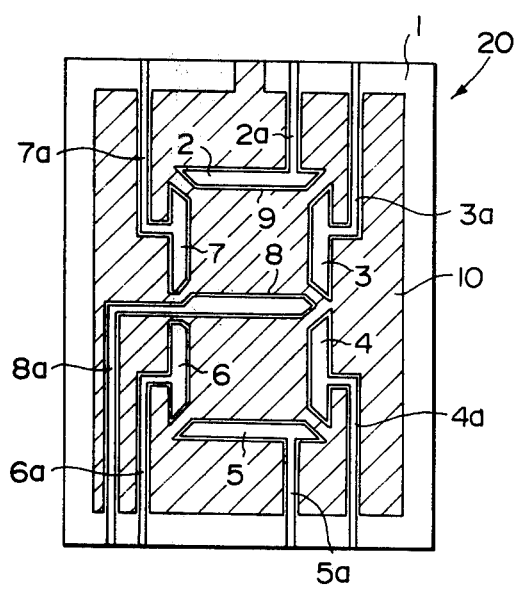
FIG. 2
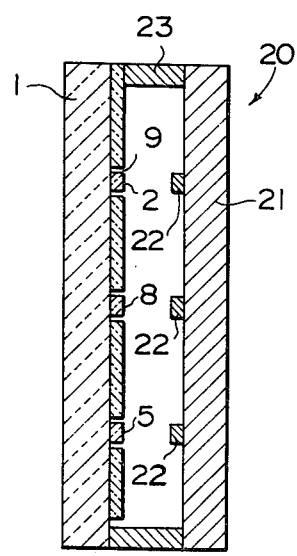
FIG. 3

ELECTROCHROMIC COMPOSITION AND ELECTROCHROMIC DISPLAY DEVICE USING SAME

BACKGROUND OF THE INVENTION

1. Field of the Invention

This invention relates to an electrochromic composition and an electrochromic display device using the same, and more particularly to an electrochromic composition containing a compound selected from the group consisting of ammonia, organic amine and alkali, and a diffusion type electrochromic display device. The "diffusion type" electrochromic display device is disclosed in United States patent application Ser. No. 769,564 and will be defined hereinafter.

2. Description of the Prior Art

Electrochromic compounds (hereinafter referred to as "EC compound") present different colors depending upon the state of the compounds, i.e. oxidized state or reduced state since the spectroscopic absorption of the compounds differs depending upon the state thereof. The EC compounds are divided into those coloring in a reduced state and those coloring in an oxidized state. The EC compounds coloring in a reduced state does not show a color or shows a light color in an oxidized state and colors in a reduced state. The EC compounds coloring in an oxidized state does not show a color or shows a light color in a reduced state and colors in an oxidized state.

The EC compounds sealed between a pair of electrodes at least one of which is transparent present color changes when application of an electric field thereacross is turned on and off. When the solubility of the EC compound dissolved in a solvent of the EC composition sealed between the pair of electrodes is low, the displayed pattern is maintained for a long time, for instance, several months. This kind of EC display device is called memory-type EC display device. When the solubility of the EC compound to the solvent is high, the displayed pattern quickly disappears upon turning off the application of the electric field. This kind of EC display device is disclosed in detail in a copending U.S. patent application Ser. No. 769,564. This kind of display device is called in said patent application "diffusion type" EC display device. The diffusion type EC display device is characterized in that between a pair of electrodes there is sealed an EC composition coloring in a reduced state which is composed of an EC compound and a solvent, the solubility of the EC compound to the solvent being not less than $10^{-2}$ mol/100 g-solvent in a reduced state and not less than $10^{-1}$ mol/100 g-solvent in an oxidized state. The EC compound is sealed between the electrodes in a reduced state.

The diffusion type EC display device is advantageous over the known memory type EC display device (as disclosed in U.S. Pat. No. 3,854,794) in that the life time is longer, the response is higher, the driving voltage can be lower, an erasing bias voltage need not be applied, and the reference electrode need not be used.

In the diffusion type EC display device as described briefly above, it is desired that the EC compound having a far clearer color and stable color presentation be provided. It is further desired that the EC display device have a far longer life and higher contrast of the pattern displayed thereby.

In order to prepare a diffusion type EC display device, the EC compound coloring in a reduced state must be sealed in a space between a pair of electrodes in a reduced colored state. The method for sealing the EC compound in the space in a reduced state is disclosed in said patent application. For instance, the EC compound coloring in a reduced state and a solvent are sealed in the space in a reducing atmosphere as of hydrogen gas, or the EC compound coloring in a reduced state and a solvent are sealed in the space in an atmosphere of inert gas as of nitrogen gas and a high potential (coloring potential) is applied to the electrodes to convert the EC compound sealed in the space into the reducing state.

The above described methods for sealing the EC compound in the space between a pair of electrodes constituting the EC display device suffer from the defects as follows. In the former method utilizing hydrogen gas, the operation is very troublesome since all the works should be conducted in the hydrogen gas and there is a danger of combustion of the gas. In the latter method utilizing nitrogen gas, the water in the solvent is electrolyzed by the high potential and bubbles of gas generated by the electrolysis appear in the display. In order to prevent the electrolysis, the potential must be lowered and applied for a long time which results in insufficient coloring.

SUMMARY OF THE INVENTION

The primary object of the present invention is to provide an EC composition which presents clear and stable color that is suitable for a diffusion type EC display device.

Another object of the present invention is to provide an EC composition which elongate the life of the display device in which the EC compound is used.

Still another object of the present invention is to provide an EC composition which enhances the contrast of the image or pattern displayed by the EC display device in which the EC compound is used.

A further object of the present invention is to provide an EC composition which can be sealed in a space between a pair of electrodes without using a hydrogen gas atmosphere.

A still further object of the present invention is to provide an EC composition which can be sealed in a space between a pair of electrodes in an atmosphere of air or nitrogen gas and need not be applied with a high coloring potential after sealed in such an atmosphere.

A still another object of the present invention is to provide an EC display device of diffusion type which has a long life and a high contrast of the image or pattern displayed thereby.

The above objects of the invention are accomplished by providing an EC composition comprising (a) a solvent, (b) an EC compound the solubility of which to the solvent is not less than $10^{-2}$ mol/100 g-solvent in a reduced state and not less than $10^{-1}$ mol/100 g-solvent in an oxidized state, and (c) a compound selected from the group consisting of ammonia, organic amine and alkali. The above objects of the present invention are also accomplished by providing an EC composition comprising (a) a solvent, (b) an EC compound the solubility of which to the solvent is not less than $10^{-2}$ mol/100 g-solvent in a reduced state and not less than $10^{-1}$ mol/100 g-solvent in an oxidized state, (c) a compound selected from the group consisting of ammonia, organic amine and alkali, and (d) a masking agent. Further, the above objects regarding the EC display device are accomplished by providing a display element consisting of a pair of electrodes at least one of which is transparent filled with said EC composition.

BRIEF DESCRIPTION OF THE DRAWING

FIG. 1 is a cross sectional view of an EC display device in accordance with an embodiment of the present invention, FIG. 2 is a plan view of a front electrode plate of a preferred embodiment of the EC display device in accordance with the present invention, and FIG. 3 is a cross sectional view of an empty EC display cell employing the front electrode plate as shown in FIG. 2.

DETAILED DESCRIPTION OF THE INVENTION

Referring to FIG. 1, a pair of electrode plates 11 and 12 are oppositely disposed and are provided on the inner surface thereof with electrode layers 13 and 14. Between the pair of oppositely disposed electrode plates 11 and 12 is provided a spacer 15 to form an enclosed space between the electrode plates 11 and 12. The space enclosed with the spacer 15 and the electrode layers 13 and 14 on the electrode plates 11 and 12 is filled with an EC composition 16. The electrode plates 11 and 12 are provided with the electrode layers 13 and 14 which are formed into the shape representing a numeral "8" for instance to indicate numerals 0 to 9 as shown in FIG. 2. In the embodiment shown in FIGS. 2 and 3, the electrode plate 1 on one side of an EC display cell 20 is provided thereon with seven-segment type display pattern elements 2 to 8 which form a numeral "8" and lead wires 2a to 8a connected therewith. Further, the electrode plate 1 is provided with a transparent film 10 which is made of the same material as that of the electrode elements 2 to 8 and the lead wires 2a to 8a and covers the area not covered with the electrodes and the lead wires in order to prevent the electrodes and the lead wires from being observed when the driving potential is not applied to the display device. As shown in FIG. 3, electrodes 22 are deposited on a back electrode plate 21 at positions facing to the front electrode elements 2 to 8. The front and back electrode plates 1 and 21 are connected to each other by means of a spacer 23 which encloses a space to be filled with an EC composition therebetween. When the EC display device thus prepared is viewed from front, the whole front area appears to be uniformly in the same color or density.

In the EC display cell as described above, an EC composition as described in detail hereinbelow is charged. Now the behavior and composition of the EC composition will be described in detail hereinbelow.

A well known organic EC compound, alkyl bipyridinium salt, is capable of taking the following three kinds of states I, II and III from one to another of which the EC compound is capable of changing.

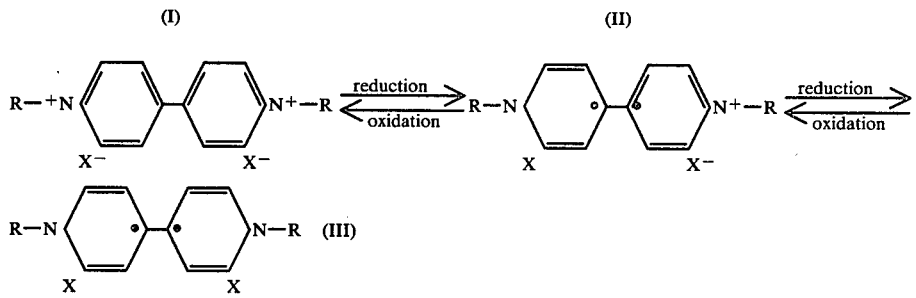

(where R is an alkyl radical and X is a negative ion of mono-valent).

As shown above, the alkyl bipyridinium salt is capable of reversibly be reduced and oxidized. In the state (I), the salt is solved in a solvent and presents no color and is transparent. In the state (II) which is the first reduced state, it presents purple-blue and has a solubility which is lowered as the number of carbons of the alkyl radical is increased. In the state (III) which is the second reduced state, the salt presents light yellow which results in low contrast of the pattern displayed and has a solubility which is lower than that of the salt in the state (II). Further, the reversibility of the compound to the state (II) is markedly lowered.

The diffusion type EC display device should be made so that the alkyl bipyridinium salt is in the state (II) in its normal condition in the sealed cell. Therefore, as seen from the above described reaction formula, the salt should be sealed in the cell with one mono anion trapped.

In accordance with this invention, the EC composition as described hereinafter is simply put into the EC display cell in a proper atmosphere as of air or nitrogen gas. It is unnecessary to seal the cell in a reduced state. This is accomplished by adding a compound selected from the group consisting of ammonia, organic amine and alkali to the EC compound employed in the diffusion type EC display device. In other words, by adding one of said compounds to the normal EC compound, the EC compound is capable of coloring without being sealed in a reduced state. The process of the coloring behavior of the EC compound to which ammonia or organic amine is added is considered to be based on the following chemical reaction.

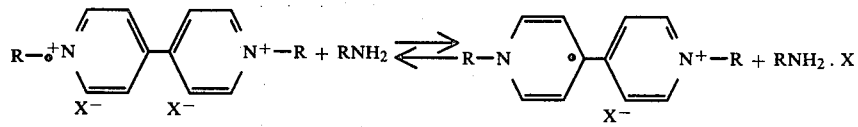

As shown above, by adding ammonia or organic amine to an EC compound, a first reduced state in which the compound presents purple-blue is obtained. The condition of the color can be controlled by the amount of the ammonia or organic amine added. However, if the amount of the ammonia or organic amine added to the EC compound is larger than the number of mols of the mono anion of the alkyl bipyridinium salt, the salt is wholly transferred to the second reduced state as shown in the following reaction formula, which results in low contrast of the pattern and poor reversibility to the oxidized state.

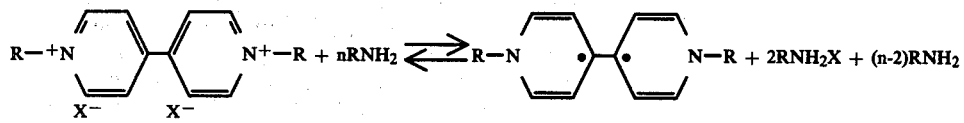

From the above mentioned reason, the amount of the ammonia or organic amine added to the EC compound should be made less than that required for completely trapping the mono anions carried by the alkyl bipyridinium salt in case that the EC compound has two different reduced states like the aforesaid alkyl bipyridinium salt. When the EC compound does not have a plurality of reduced states as alkyl phenazine salt or when the plurality of reduced states are all properly utilized as the state of display, the amount of the ammonia or organic amine is not limited as above.

When alkali is added to the EC compound, the similar coloring state is obtained without using a hydrogen atmosphere or applying a high coloring potential after sealing in an inert atmosphere, although the chemical process for effecting the coloring state is not clarified. Further, in this case also, the condition of the color is controlled by changing the amount of alkali. This was confirmed by a number of tests.

As the EC compound to be used in the EC composition of this invention, can be used pyridine derivatives, bipyridinium derivatives, phenazine derivatives, aminoquinone derivatives, rhodamine derivatives, diphthalocyanine derivatives, and compounds represented by the formula:

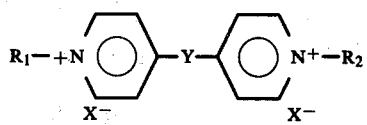

where Y is —CH=N—, —CH=CH—, —C≡C—, —N=N—,

etc, and $R_1$ and $R_2$ are alkyl radial or alkoxy radical, and $X^-$ is mono anion.

The solubility of the EC compound used in the EC composition of present invention should not be less than $10^{-2}$ mol/100 g-solvent in a reduced state and not less than $10^{-1}$ mol/100 g-solvent in an oxidized state.

The amount of the EC compound to be contained in the EC composition of the present invention should be within the range of 0.1 to 10 wt.% of the whole EC composition, and preferably within the range of 1 to 5 wt.%. When the amount is falls below 0.1 wt.% the contrast of the displayed pattern is lowered and the life time is shortened. When it exceeds 10 wt.%, no change in effect is observed. Therefore, in order to save the amount of the EC compound, 10 wt.% is enough to obtained the aimed results.

As the solvent to be used in the EC composition of this invention, water, mixture of water and alcohol, mixture of water and alcohol to which a little amount of ester, keton, or alkyl benzene, etc. can be used. The alcohol is a compound in which hydrogens of aliphatic hydrocarbons, ring compounds or side chains are substituted by hydrooxyl groups. Particularly, divalent or trivalent alcohol such as ethylene glycol or glycerol is preferred. The above mentioned multivalent alcohols are preferred to be contained in the amount of 70 wt% or more of the whole solvent so that a sufficient amount of water be contained in the hydrophilic multivalent alcohol. Further, to the above solvent, inorganic salt such as KBr and NaCl or organic salt may be added as an electrolyte.

The aforesaid organic amine to be used in the composition of this invention is a compound in which hydrogen atoms of ammonium represented by $NH_3$ are substituted by hydrocarbon radicals (R), such as primary amine, secondary amine and tertiary amine of aliphatic group, alicyclic group and aromatic group, and compound containing a combination of primary amine and secondary amine.

The primary amine of aliphatic group is represented by a general formula of $R-NH_2$ and is, for example, methyl amine, ethyl amine, propyl amine, isopropyl amine, butyl amine, amylamine, hexyl amine, heptyl amine, octyl amine, nonyl amine, decyl amine, undecyl amine, dodecyl amine, tetradecyl amine, pentadecyl amine, cetyl amine, etc.

The secondary amine of aliphatic group is represented by a general formula of

and is, for example, dimethyl amine, diethyl amine, dipropyl amine, diisopropyl amine, dibutyl amine, diamyl amine, etc.

The tertiary amine of aliphatic group is represented by a general formula of

and is, for example, trimethyl amine, triethyl amine, tripropyl amine, tributyl amine, triamyl amine, etc.

Although the R, R', R'' have been described as saturated alkyl group of straight chain and ramified chain, these may be aliphatic unsaturated amine such as arylamine, diaryl amine, and triaryl amine or may be amine in which a part of alkyl group is substituted by hydroxyl group, nitro group, carboxyl group, cyano group, keton or ester.

Further, it may be a compound in which molecules primary amine and secondary amine exist like triethylene tetramine. Further, alicyclic amine such as cyclopropyl amine, cyclobutyl amine, cyclopentyl amine, and cyclohexyl amine can be used.

As the aromatic amine can be used primary amine of aromatic group such as aniline, O-toluidine, m-toluidine, p-toluidine, benzyl amine, α-naphtyl amine, β-naphtyl amine, etc., secondary amine of aromatic group such as methyl aniline, ethyl aniline, dibenzyl amine, diphenyl amine, etc., and tertiary amine of aromatic group such as dimethyl aniline, diethyl aniline, tribenzyl amine,, triphenyl amine, etc.

On the other hand, the alkali to be used in the composition of this invention is a substance which dissolves in water such as alkali metal hydroxide, ammonium hydroxide, sodium carbonate, ammonium carbonate and sodium phosphate. Among these examples of alkali sodium hydroxide and potassium hydroxide are preferred in view of the resulting contrast of the image obtained and the life time.

The added amount of ammonia, organic amine and alkali should be changed according to the kind of the EC compound employed. Generally, the amount of these additives should preferably be within the range of ½ to 3/2 mol. Among the additives as mentioned above, ammonia and organic amine are preferred from the viewpoint of the resulting contrast of display, stability of display and life time. Particularly, the organic amine is preferred in this respect. This is considered to be based on the difference in process in trapping the mono anion as shown in said reaction Now a detailed description of the organic amine to be used in the EC composition of the present invention will be made hereinbelow. The effect of the organic amine to color the EC compound depends upon the kinds of the amine and the kinds of the EC compound used in combination with the amine. When the effect is great, the EC display device of diffusion type can be simply obtained by only filling the EC display cell with the EC composition containing the amine. When the effect is low, the EC composition is first sealed in the cell and then a coloring potential is applied to the cell to color the EC composition. However, even in this case, the level of the coloring potential can be markedly lowered in comparison with the conventional EC composition in which no amine is contained. The great effect of coloring the EC compound is obtained in case of the primary amine of aliphatic group and then the secondary amine of aliphatic group. The effect is lowered in the order of the tertiary amine of aliphatic group, the primary amine of aromatic group, the secondary amine of aromatic group and the tertiary amine of aromatic group.

In case that water soluble amine or ammonia is used, the pH of the solution is increased as well as the trapping effect is obtained which results in high effect of coloring the EC compound. Particularly when acid salt EC compound which makes a water solution thereof acid is used, the pH is increased to neutral or alkali by using said water soluble amine, whereby the deterioration of the electrode provided in the display cell is prevented and a stable EC display device can be obtained.

The above water soluble amine is for instance hydrocarbon groups (R) having a small number of carbon atoms or partly substituted by hydrophilic groups like —OH or —COOH.

In the EC composition in accordance with the present invention, a masking agent can be further contained besides said composition components of solvent, EC compound and additive such as amine. As the masking agent can be used any kind of fine particles so long as the rear electrode is optically hindered thereby. Normally, various kinds of pigment are used as the masking agent whether they are organic or inorganic. The masking agent must be stable in the EC composition and have a sufficient masking effect. From this reason, metal pigments and extender pigments are not suitable for the masking agent. The color of the pigments is selected depending upon the color of the EC compound.

As the inorganic pigments can be used white pigments such as titanium oxide, zinc sulfide and lithopone, black pigments such as carbon black and graphite, red pigments such as red lead and cadmium red, yellow pigments such as chrome yellow, zinc yellow and cadmium yellow, blue pigments such as prussian blue, ultramarine and cobalt blue, green pigments such as chrome green, emerald green and zinc green, and brown pigments such as iron oxide and red oxide. As the organic pigments can be used yellow-2, yellow-3, orange-5, red-3, and red-4 in the C.I.Name. Among these pigments, the white pigment as of titanium oxide is preferred from the viewpoint of masking effect and stability of display.

The amount of the masking agent to be contained in the EC composition of the present invention depends upon the masking effect thereof, which is normally within the range of 10 to 70 wt.% of the whole composition. When the spacing between the oppositely faced electrode plates is several tens to several thousands of microns, the amount of the masking agent is preferred to be within the range of 30 to 70 wt.%, and more preferably from the viewpoint of stability of display and prevention of sedimentation within the range of 40 to 60 wt.%.

The structure of the EC display device in which the above described EC composition is to be sealed is as described hereinbefore with reference to the accompanying drawings. Further, the structure is disclosed for instance in British Pat. No. 1,427,489 and U.S. Pat. No. 3,451,741.

When the above described diffusion type EC display device is used as a transmission type display device, the electrodes plates 1 and 21 are made transparent and an EC composition which does not contain the masking agent is put into the display cell. When a reflection type EC display device is to be made, the EC composition containing the masking agent is used or a porous opaque film such as a filter paper is put into the display cell and the EC composition which does not contain the masking agent is used. Particularly in the diffusion type EC display device, a reflection type display device using the EC composition containing the masking agent gives a good result from the viewpoint of response and stability of display.

Now the preferred embodiments of the present invention will be described in detail with reference to the results of tests of actual examples made in accordance with the present invention. In the following embodiments, the EC composition contains a masking agent or a porous opaque film. It should be understood, however, that the present invention is not limited to these embodiments.

EXAMPLE 1

5 wt.% of γ, γ'-dimethyl bipyridinium dibromide (EC compound), 40 wt.% of ethylene glycol, 4 wt.% of distilled water, 47 wt.% of titanium oxide ($TiO_2$), 3 wt.% of gelatin and 1 wt.% of defoaming agent plus dispersing agent were mixed and stirred in a ball mill the interior of which was substituted by nitrogen gas for 24 hours, and then butyl amine was added to 10 g of the composition in an atmosphere of nitrogen gas. The amount of the butyl amine added to the EC composition as an organic amine was changed as $7.25 \times 10^{-4}$ mol (half in mol number of the EC compound), $1.45 \times 10^{-3}$ mol (same in mol number of the EC compound), $2.17 \times 10^{-3}$ mol (1.5 times in mol number as many as that of EC compound), and $2.9 \times 10^{-3}$ mol (twice in mol number as many as that of EC compound). By adding the butyl amine to the EC composition as prepared above, the EC composition was colored into blue.

The composition thus prepared was put into an EC display cell composed of a pair of glass plates having a thickness of 3 mm carrying thereon a transparent electrode layer vacuum evaporated of indium oxide having a surface resistance of $10\Omega/cm^2$ oppositely disposed with a spacing of $100\mu$. After the EC composition was put into the cell, the inlet used for putting in the composition was sealed by use of a soft metal. Thus, a diffusion type EC display device was prepared. The degree of coloring at the time the EC display device was prepared was named initial coloring degree. The cell was then applied with a driving potential of 1 volt of DC power which was periodically inverted at time interval of 1 second. The EC display device in which the initial coloring degree was low was changed to present a high coloring degree after 30 minutes of application of the periodically inverting DC potential. The sequential change of the coloring degree effected by the application of the potential was measured to know a coloring time.

When the amount of the butyl amine added to the EC composition was $7.25 \times 10^{-4}$ mol to the 10 g of the composition, the coloring degree was about 70% which was considered to be the maximum in which almost all γ,γ'-dimethyl bipyridinium bromide was converted to the reduced state (coloring degree:B) and the color had a long life of $10^7$ times or more of inversion of the applied potential in the above mentioned method of driving (life:++).

When the amount of the butyl amine was $1.45 \times 10^{-3}$ mol and $2.17 \times 10^{-3}$ mol, the initial coloring degree was almost maximum (A) and the life was $10^7$ times or more (++). When the amount was $2.9 \times 10^{-3}$ mol, the initial coloring degree was almost maximum (A) but the life was about $10^4$ times (−) which means the color was changed from purple blue to light yellow when the applied potential was inverted about $10^4$ times.

The butyl amine was named Sample No. 1 and various other amines were tested in the sample names as follows.

| Sample No. | Name of amines |
|---|---|
| 2 | nonyl amine |
| 3 | 2-amino-2-methyl-1-propanol |
| 4 | dipropyl amine |
| 5 | dibutyl amine |
| 6 | triethyl amine |
| 7 | tripropyl amine |
| 8 | diaryl amine |
| 9 | cyclohexyl amine |
| 10 | aniline |
| 11 | dimethyl amine |
| 12 | benzyl aniline |
| 13 | triethylene tetramine |
| 14 | p-amino-diphenyl amine |

The results of the tests of these samples are shown in the table below. As shown in the table, the amount of the organic amine added to the EC compound is preferred to be within the range of ½ to 3/2 times in terms of mol number as many as that of the EC compound. Further, when the organic amine was not added to the EC compound, the coloring potential required to be applied to the cell to obtain the initial coloring degree of (A) was 1.85 V, which was lowered to 1.0 V by adding organic amine to the EC compound.

In the following table initial coloring degree is ranked from A to D, and the life is ranked from (++) to (−) as follows.

Initial coloring degree:
 A: sufficient coloring (100%)
 B: almost maximum coloring (70%)
 C: lowered coloring (40%)
 D: faintly coloring (10%)

Life of Coloring:
 ++: color not faded after $10^7$ times of inversion of DC1 V at 1 second cycle
 +: color not faded after $10^6$ times of inversion
 −: color not faded after $10^4$ times of inversion

TABLE

| Sample No. | $7.25 \times 10^{-4}$ mol Init. Color | Life | $1.45 \times 10^{-3}$ mol Init. Color | Life | $2.17 \times 10^{-3}$ mol Init. Color | Life | $2.9 \times 10^{-3}$ mol Init. Color | Life |
|---|---|---|---|---|---|---|---|---|
| 1 | B | ++ | A | ++ | A | ++ | A | − |
| 2 | B | ++ | A | ++ | A | ++ | A | − |
| 3 | B | ++ | A | ++ | A | ++ | A | + |
| 4 | C | ++ | B | ++ | B | ++ | A | + |
| 5 | C | ++ | B | ++ | B | ++ | A | + |
| 6 | C | ++ | C | ++ | C | ++ | B | + |
| 7 | C | ++ | C | ++ | C | ++ | B | + |
| 8 | C | ++ | C | ++ | C | ++ | B | + |
| 9 | B | ++ | B | ++ | A | ++ | A | − |
| 10 | C | ++ | C | ++ | B | ++ | A | + |
| 11 | D | ++ | D | ++ | C | ++ | B | + |
| 12 | B | ++ | B | ++ | A | ++ | A | + |
| 13 | B | ++ | B | ++ | A | ++ | A | + |
| 14 | C | ++ | C | ++ | B | ++ | B | + |

EXAMPLE 2

As the EC compound, γ,γ-di(p-cyanophenyl)-bipyridinium bromide was used and $2.17 \times 10^{-3}$ mol of butyl amine was added to the EC compound in the same process as that employed in EXAMPLE 1. Consequently, the EC composition colored into green. The EC display device using thus obtained composition was tested by the same method as that employed in Example 1, which resulted in long life of more than $10^7$ times.

EXAMPLE 3

As the EC compound, methylphenazine bromide was used and $2.17 \times 10^{-3}$ mol of butyl amine was added thereto, which resulted in coloring into green. The measured life was more than $10^7$ times.

EXAMPLE 4

As the EC composition was used a composition composed of 5 wt.% of γ,γ'-bipyridinium hydrochloride

35 wt.% of ethylene glycol, 9 wt.% of distilled water, 47 wt.% of titanium oxide (TiO$_2$), 3 wt.% of gelatin, and 1 wt.% of defoaming agent and dispersing agent. The pH of the composition was 3. The composition having such a high acidity had not been used in the conventional art because of its affect on the transparent electrode plates as of indium oxide and tin oxide. However, by adding thereto butyl amine, the composition was colored into blue and the pH was increased to 7. At the pH of 6.8, the composition started coloring and at the pH of 7 the composition was sufficiently colored into favorable blue. The colored composition was used to made an EC display device in the same manner as that employed in EXAMPLE 1. The results of the test showed that the transparent electrodes were not damaged by the composition. Thus, by adding the water soluble amine to the EC compound, it was made possible to use acid salt EC compounds as the EC compounds filling the EC display cell.

EXAMPLE 5

An aqueous solution (28%) was added to the EC compound as used in EXAMPLE 1 in the amount of $2.17 \times 10^{-3}$ mol when calculated in terms of ammonia, so that the EC compound was colored into purple blue. The EC compound thus prepared was used to make an EC display device. The life was more than $10^7$ times.

EXAMPLE 6

7 wt.% of γ,γ'-dimethyl bipyridinium bromide, 72 wt.% of ethylene glycol. 15 wt.% of distilled water, 5 wt.% of gelatin and 1 wt.% of defoaming agent were mixed and stirred together. To 10 g of the composition thus prepared was added 0.05 g of KBr and $2.17 \times 10^{-3}$ mol of butyl amine, so that the composition was colored into blue.

Thus prepared EC composition was put into an EC display cell as used in EXAMPLE 1. Further, in the cell was provided a porous opaque film having a thickness of 50μ (Membrane Filter TM-2; made by Toyo Roshi K.K.). Then, the aperture through which the EC composition was charged in the cell was sealed by a soft metal. The DC display device thus prepared showed favorable color and life.

EXAMPLE 7

To the EC compound as used in EXAMPLE 1 was added alkali to make it colored into blue in the amount of $7.25 \times 10^{-4}$ mol (½ times in mol number), $2.17 \times 10^{-3}$ mol (3/2 times) and $2.0 \times 10^{-3}$ mol (twice). As the alkali was used, sodium hydroxide (Sample No. 1), potassium hydroxide (Sample No. 2), lithium hydroxide (Sample No. 3) and sodium carbonate (Sample No. 4). The results obtained are shown in the following table in the same manner as that employed in the first table showing the results of EXAMPLE 1

TABLE

| Sample No. | $7.25 \times 10^{-4}$ mol Init. Color | Life | $2.17 \times 10^{-3}$ mol Init. Color | Life | $2.9 \times 10^{-3}$ mol Init. Color | Life |
|---|---|---|---|---|---|---|
| 1 | B | ++ | A | + | A | − |
| 2 | B | ++ | A | + | A | − |
| 3 | C | ++ | B | − | B | − |
| 4 | C | ++ | B | − | B | − |

EXAMPLE 8

As the EC compound was used γ,γ'-di(p-cyanophenyl) bipyridinium bromide was used. $2.17 \times 10^{-3}$ mol of sodium hydroxide was added to make the EC compound color in green. The life measured was more than $10^6$ times.

EXAMPLE 9

As the EC compound was used methylphenazine bromide and $2.17 \times 10^{-3}$ mol of sodium hydroxide was added to the EC compound to make it color in green. The life measured was more than $10^7$ times.

EXAMPLE 10

Instead of the butyl amine added to the composition prepared in EXAMAPLE 6, the same amount of potassium hydroxide was added. The results were quite the same as those obtained in EXAMPLE 6 in the obtained color and in the life of the display device made by use thereof together with the membrane filter as used in EXAMPLE 6.

EXAMPLE 11

Similarly to EXAMPLE 1, to an EC composition prepared according to EXAMPLE 1 were added $1.45 \times 10^{-3}$ mol of 2-amino-2-methyl-1-propanol, $1.45 \times 10^{-3}$ mol of ammonia (in the form of aqueous ammonia of 28% concentration), and $1.45 \times 10^{-3}$ mol of sodium hydroxide separately. These samples were named Sample A, B and C, respectively. These samples were tested of their life and durability by an acceleration test in which D.C. 1 volt was continuously applied to the samples. Sample A did not change at all after $10^3$ hours passed. Sample B showed unevenness in density of displayed pattern on the cathode when $8 \times 10^2$ hours passed. Sample C showed the defect similar to that of Sample B when 50 hours passed. These results show that the organic amine is the most preferred from the viewpoint of the life of the EC display device in which the additive was used. The second preferred additive was found to be ammonia and the third was alkali.

I claim:

1. An electrochromic composition comprising a solvent, an electrochromic compound which is colored in a reduced state, the solubility to the solvent of which is not less than $10^{-2}$ mol/100 g-solvent in said reduced state and not less than $10^{-1}$ mol/100 g-solvent in an oxidized state, and an additive compound selected from the group consisting of (a) ammonia, (b) an amine where all substituents thereof are radicals selected from the group of aliphatic radicals, alicyclic radicals and aromatic radicals and (c) an alkali compound selected from the group consisting of hydroxides, carbonates, and phosphates, said electrochromic compound occurring in said reduced state and the solution of the reduced electrochromic compound being basic due to the presence of said additive compound.

2. An electrochromic composition according to claim 1 further comprising a masking agent.

3. An electrochromic composition according to claim 1 or 2, wherein said radical is an aliphatic radical.

4. An electrochromic composition according to claim 3 wherein said amine is represented by the general formula R—NH$_2$ and R is said aliphatic radical.

5. An electrochromic composition according to claim 3 wherein said amine is represented by the general formula

where R and R' are said aliphatic radicals.

6. An electrochromic composition according to claim 1 or 2, wherein said radical is an aromatic radical.

7. An electrochromic composition according to claim 1 or 2, wherein said alkali compound is sodium hydroxide.

8. An electrochromic composition according to claim 1 or 2, wherein said alkali compound is potassium hydroxide.

9. An electrochromic display device comprising an electrochromic display cell and an electrochromic composition filled in said cell, said electrochromic composition comprising a solvent, an electrochromic compound which is colored in a reduced state, the solubility of the solvent of which is not less than $10^{-2}$ mol/100 g-solvent in said reduced state and not less than $10^{-1}$ mol/100 g-solvent in an oxidized state, and an additive compound selected from the group consisting of (a) ammonia, (b) an amine where all substituents thereof are radicals selected from the group of aliphatic radicals, alicyclic radicals and aromatic radicals and (c) an alkali compound selected from the group consisting of hydroxides, carbonates, and phosphates, said electrochromic compound occurring in said reduced state and the solution of the reduced electrochromic compound being basic due to the presence of said additive compound.

10. An electrochromic display device according to claim 9 wherein said electrochromic composition further comprises a masking agent.

11. A device as in claim 9 where said additive compound is selected from the group consisting of said ammonia and said amine.

12. An electrochromic display device according to claims 9 or 11 wherein said electrochromic compound is an acid salt compound.

13. An electrochromic display device according to claim 12 wherein said amine is water soluble.

14. A composition as in claim 1 where said additive compound is selected from the group consisting of said ammonia and said amine.

15. A composition as in claims 1 or 14 where said solvent is selected from the group consisting of (a) water, (b) water and alcohol, and (c) water and alcohol to which a small amount of ester, ketone, or alkyl benzene is added.

16. A composition as in claim 15 where said electrochromic compound is selected from the group consisting of pyridine derivatives, bipyridinium derivatives, phenazine derivatives, aminoquinone derivatives, rhodamine derivatives, and diphthalocyanine derivatives.

17. A composition as in claim 16 where said electrochromic compound is present within the range of 0.1 to 10 wt.% of said composition, and preferably within the range of 1 to 5 wt.%.

18. A composition as in claims 1 or 14 where the said electrochromic compound is alkyl bipyridinium salt, it being so reduced by said additive compound that one mono anion thereof is trapped.

19. A composition as in claim 18 where the number of mols of said additive compound is no more than the number of mols of the mono anion of the alkyl bipyridinium salt.

20. A device as in claims 9 or 11 where said solvent is selected from the group consisting of (a) water, (b) water and alcohol, and (c) water and alcohol to which a small amount of ester, ketone, or alkyl benzene, is added.

21. A device as in claim 20 where said electrochromic compound is selected from the group consisting of pyridine derivatives, bipyridinium derivatives, phenazine derivatives, aminoquinone derivatives, rhodamine derivatives, and diphthalocyanine derivatives.

22. A device as in claim 21 where said electrochromic compound is present within the range of 0.1 to 10 wt.% of said composition, and preferably within the range of 1 to 5 wt.%.

23. A method of operating an electrochromic display device comprising a pair of oppositely disposed electrode plates each bearing on the inner surface thereof an electrode and an electrochromic composition sealed between said pair of oppositely disposed electrode plates, said electrochromic composition comprising an electrochromic compound which is colored in a reduced state and a solvent, the solubility of said electrochromic compound to said solvent being not less than $10^{-2}$ mol/(100g solvent) in said reduced state and not less than $10^{-1}$ mol/(100g solvent) in an oxidized state, and an additive selected from the group consisting of (a) ammonia, (b) an amine where all substituents thereof are radicals selected from the group of aliphatic radicals, alicyclic radicals and aromatic radicals, and (c) an alkali compound selected from the group consisting of hydroxides, carbonates, and phosphates, said electrochromic compound occurring in said reduced state and the solution of the reduced electrochromic compound being basic due to the presence of said additive compound, said method comprising the steps of energizing said device by applying an electrical potential across said plates and extinguishing said device by only removing said potential therefrom.

24. A method as in claim 23 where said additive compound is selected from the group consisting of said ammonia and said amine.

25. A method as in claims 23 or 24 where said solvent is selected from the group consisting of (a) water, (b) water and alcohol, and (c) water and alcohol to which a small amount of ester, ketone, or alkyl benzene is added.

26. A method as in claim 25 where said electrochromic compound is selected from the group consisting of pyridine derivatives, bipyridinium derivatives, phenazine derivatives, aminoquinone derivatives, rhodamine derivatives, and diphthalocyanine derivatives.

27. A method as in claim 26 where said electrochromic compound is present within the range of 0.1 to 10 wt.% of said composition, and preferably within the range of 1 to 5 wt.%.

28. A method as in claims 23 or 24 where the electrochromic compound is alkyl bipyridinium salt, it being so reduced by said additive compound that one mono anion thereof is trapped.

29. A method as in claim 28 where the number of mols of said additive compound is no more than the number of mols of the mono anion of the alkyl bipyridinium salt.

30. The composition as in claim 15 wherein said electrochromic compound is selected from the group of compounds represented by the formula;

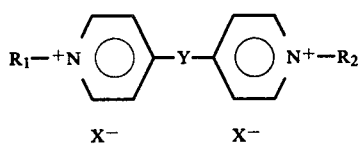

where Y is —CH=N—, —CH=CH—, —C≡C—, —N=N—, or

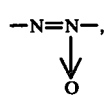

and $R_1$ and $R_2$ are alkyl radicals or alkoxy radicals, and $X^-$ is a mono anion.

31. A device as in claim 20 where said electrochromic compound is selected from the group of compounds represented by the formula;

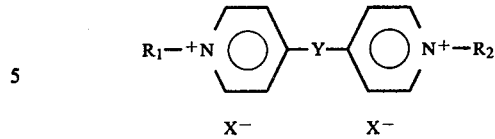

where Y is —CH=N—, —CH=CH—, —C≡C—, —N=N—, or

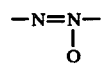

and $R_1$ and $R_2$ are alkyl radicals or alkoxy radicals, and $X^-$ is a mono anion.

32. A method as in claim 25 where said electrochromic compound is selected from the group of compounds represented by the formula;

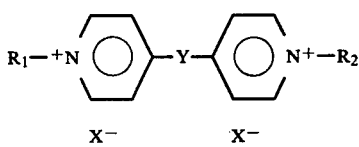

where Y is —CH=N—, —CH=CH—, —C≡C—, —N=N—, or

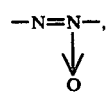

and $R_1$ and $R_2$ are alkyl radicals or alkoxy radicals, and $X^-$ is a mono anion.

* * * * *